United States Patent [19]

Jones et al.

[11] 4,213,143
[45] Jul. 15, 1980

[54] COLOR TELEVISION CONVERSION APPARATUS FOR USE WITH A CONVENTIONAL DOMESTIC REPRODUCER

[76] Inventors: Sidney C. Jones, Thorn House, Upper St. Martin's La., London W02H 9ED; Henry R. Lindsay, 22 Kinloch Dr., Kingsbury London N.W. 9; Denis W. Heightman, Thorn House, Upper St. Martin's La., London W02H 9ED, all of England

[21] Appl. No.: 849,903

[22] Filed: Nov. 9, 1977

[30] Foreign Application Priority Data

Nov. 10, 1976 [GB] United Kingdom ............... 46821/76

[51] Int. Cl.² .............................................. H04N 5/79
[52] U.S. Cl. .......................................... 358/4; 358/11
[58] Field of Search ....................... 358/11, 12, 14, 16, 358/4

[56] References Cited

U.S. PATENT DOCUMENTS

3,845,237  10/1974  Yamakawa ............................. 358/4
3,917,415  11/1975  Eguchi ................................... 358/11

*Primary Examiner*—John C. Martin
*Attorney, Agent, or Firm*—Robert F. O'Connell

[57] ABSTRACT

Color television conversion apparatus comprises mechanism adapted for moving a color television record past a pick-up device at a speed suitable for reproducing color television signals recorded thereon substantially in accordance with the field and line standard in the United States of America of 60 filed scans per second and 525 line scans per picture, decoding apparatus adapted to recover the luminance and color-difference signals, and encoding apparatus adapted to re-encode the luminance and color-difference signals in accordance with either the European PAL or SECAM standard to produce a hybrid signal suitable for use in reproducing the recorded images on a European PAL or SECAM receiver but substantially at the United States field and line rate.

2 Claims, 4 Drawing Figures

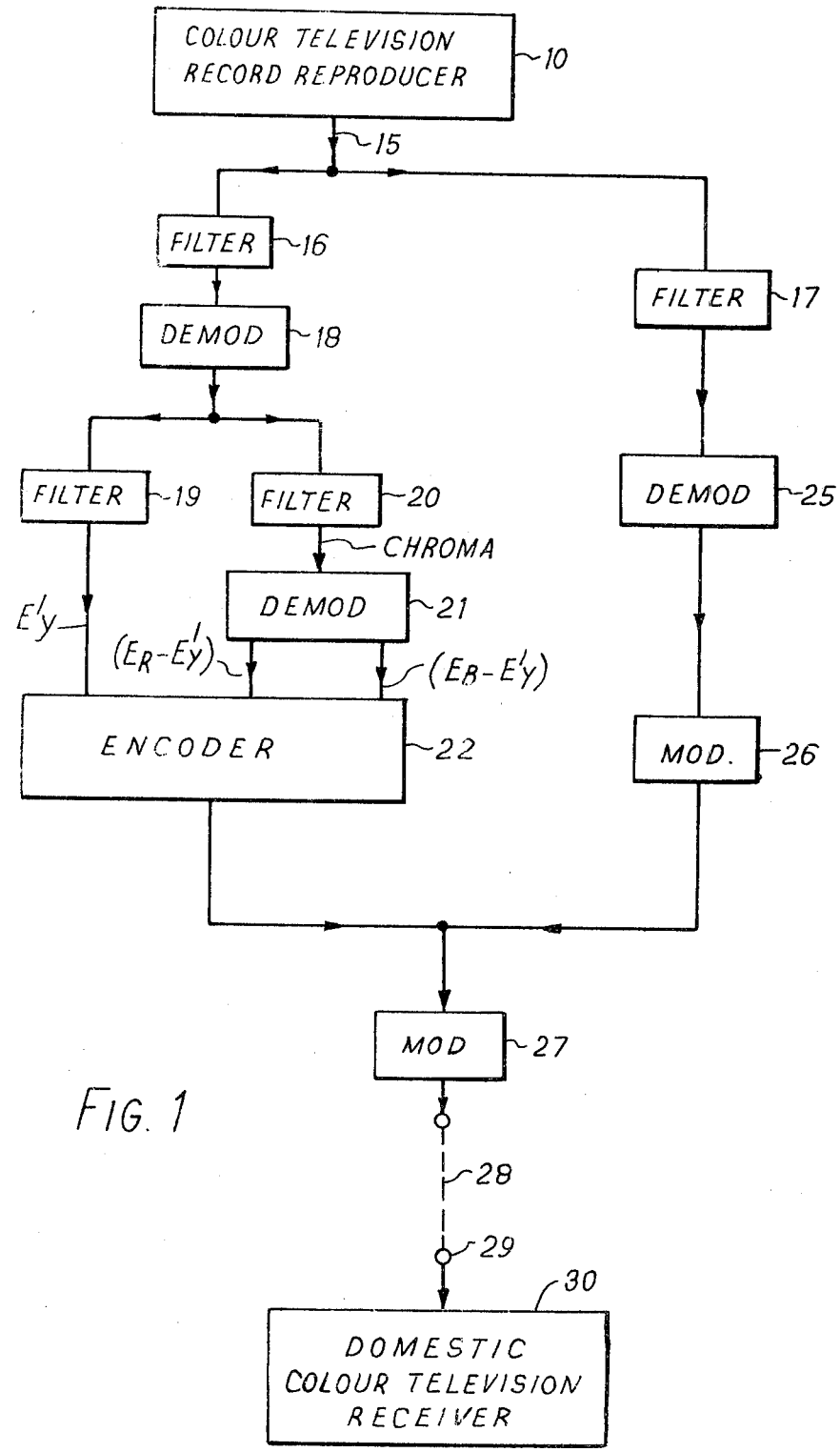

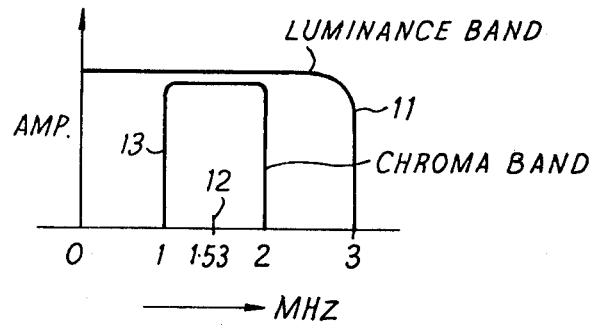
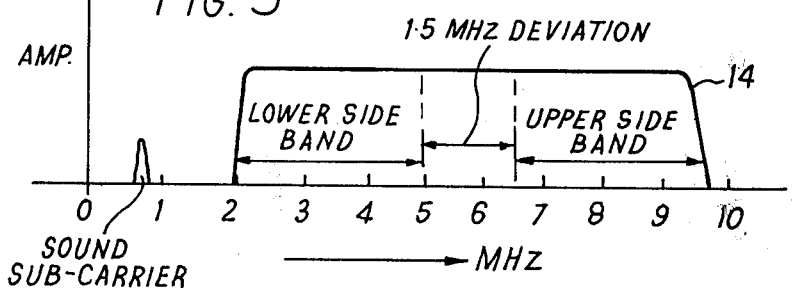
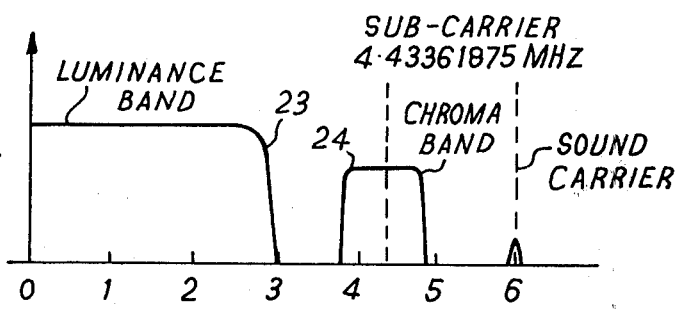

COLOR TELEVISION CONVERSION APPARATUS FOR USE WITH A CONVENTIONAL DOMESTIC REPRODUCER

The present invention relates to colour television and is concerned with apparatus for enabling colour television records to be reproduced by means of a domestic colour television receiver.

A considerable amount of work has now been done, mainly by the Phillips Company in Holland, and the Radio Corporation of America, in the recording of colour television programmes for domestic use and in the design of apparatus for reproducing such recorded colour television signals and putting them into a form suitable for application to a domestic colour television receiver.

However, there are two factors inhibiting the full exploitation of such recordings and reproducing apparatus. Firstly, there is the difference in standards between countries such as the United States Of America and Japan on the one hand, and European countries on the other. In the United States and Japan the scanning rates used in television are 60 field scans per second and 525 lines per picture. In Europe the corresponding scanning rates are 50 field scans per second and 625 lines per picture. Secondly, arising from this difference in scanning standards, it has not yet been possible to arrive at an international standard applicable to all colour television recordings for domestic use.

It is one object of the present invention to provide apparatus whereby recordings made of colour television programmes in accordance with the United States standard scanning rates can be reproduced by domestic colour television receivers engineered for reproducing images from PAL or SECAM colour television signals in accordance with European standard scanning rates.

It is another object of the present invention to provide apparatus whereby the formulation of an international standard for domestic colour television recordings is facilitated.

The invention stems from the realisation that in providing domestic reproducing apparatus for recorded colour television signals it is not feasible to design apparatus for rotating a disc record or for moving a tape record at a speed which exactly conforms to the speed required for reproduction of recorded colour television signals exactly in accordance with either the United States or the European scanning standards and that the percentage variation in such speed is more than the percentage difference in the United States and European systems. An important factor governing the speed of movement in existing domestic colour television record reproducers lies in the use of synchronous motors driven from the mains supply and variations up to 2% are not uncommon. In contrast the percentage difference between the line scanning time in the United States and European standards (63.5 and 64 microseconds respectively) is 0.8%, that is well within the said 2% speed variation.

In addition, existing frame time base circuits engineered in accordance with the 50 cycles per second European standard can be locked into synchronysm with synchronising pulses at the 60 cycles per second United States standard. Even if in the future frame time base locking should come to be engineered by the use of a counter to count the line scans and to trigger the frame time base signal, it would be a simple matter to include in domestic receivers an additional counter which could be selectively brought into use when frame time base triggering is required at the rate of 60 cycles per second.

Further in addition, it is the practice at present not to record a standard NTSC or PAL or SECAM signal for domestic use. In the RCA System the band width of the luminance signal is restricted to about 3 MHz and the sub-carrier used for the colour difference signals is about 1.5 MHz. In the Philips system tne NTSC "Crossband System" is used in which the bandwidth of the luminance signal is also restricted and the sub-carrier for the colour-difference signals is outside the band of the luminance signal. The colour difference signals themselves may not be in a form suitable for direct use in an NTSC, PAL or SECAM receiver and hence in existing domestic colour television signal reproducers decoding apparatus is provided which removes the colour difference signals from the reproduced luminance signal and encoding apparatus is provided for re-encoding the colour difference signals on the luminance signal in accordance with NTSC standards for United States recordings and either PAL or SECAM standards for European recordings.

Thus it is feasible and satisfactory to use a domestic colour television recording made in accordance with United States scanning standards for operating a colour television receiver engineered in accordance with European PAL or SECAM standards provided (1) the mechanism for moving the record is adapted to move the record past the pick-up device at a speed suitable for reproducing the colour television signals recorded thereon substantially in accordance with the field and line standard of the United States, (2) de-coding apparatus is provided to recover the colour difference signals, and (3) encoding apparatus is provided to re-encode the colour difference signals on the luminance signal in accordance with the European PAL or SECAM standard as required. This produces a hybrid signal in which the field and line rates are substantially in accordance with the United States standard and the colour difference signals are encoded in accordance with the PAL or SECAM European standard. The hybrid signal can be transmitted to the PAL or SECAM receiver by applying it to modulate a carrier oscillation for application to the aerial socket of the receiver or the hybrid video signal can be applied direct to the video circuits of the receiver. The sound signal accompanying the video signal will also need to be taken from the record and put into a form suitable for transmission at the same time to the PAL or SECAM receiver.

According to the present invention therefore, there is provided colour television conversion apparatus comprising mechanism adapted for moving a colour television record past a pick-up device at a speed suitable for reproducing colour television signals recorded thereon substantially in accordance with the field and line standard in the United States of America of 60 field scans per second and 525 line scans per picture, decoding apparatus adapted to recover the luminance and colour-difference signals, and encoding apparatus adapted to re-encode the luminance and colour-difference signals in accordance with either the European PAL or SECAM standard to produce a hybrid signal suitable for use in reproducing the recorded images on a European PAL or SECAM receiver but substantially at the United States field and line rate.

The invention will now be described by way of example with reference to the accompanying drawings, in which FIG. 1 is a block circuit diagram of an arrangement including one embodiment of the invention, FIG. 2 is an explanatory diagram showing the form of a colour television signal to be recorded in accordance with U.S.A. frame and line standards, FIG. 3 is a second explanatory diagram showing the manner in which the signal of FIG. 2 is recorded, and FIG. 4 is a third explanatory diagram showing the manner in which the signal of FIG. 2 recovered from a recording according to FIG. 3 is re-encoded into a form suitable for transmission to and reproduction by a domestic U.K. PAL colour television receiver.

Referring to FIG. 1, a domestic reproducer 10 is assumed to be of the form designed by the Radio Corporation of America (RCA) to reproduce colour television signals recorded thereon in the form currently proposed by RCA. The explanatory diagram of FIG. 2 shows the video form of this signal as initially prepared for recording. The bandwidth of the luminance signal is restricted to 3 MHz as indicated by the curve 11 and the sub-carrier for the colour-difference signals is of the non-standard value of 1.53 MHz as indicated at 12. The colour-difference signals are in the form of ($E_R$-$E_Y'$) and ($E_B$-$E_Y'$) and modulate sub-carriers in phase-quadrature at the 1.53 MHz frequency. The bandwidth of this chroma signal is approximately 1 MHz centred on the 1.53 MHz sub-carrier frequency as indicated by the curve 13. As shown by the explanatory diagram of FIG. 3 the signal of FIG. 2 is recorded on the RCA disc record as an FM (frequency-modulation) signal occupying a band of about 7.5 MHz from 2 MHz to about 9.5 MHz as indicated by the curve 14. Accompanying sound is recorded on a further sub-carrier of about 0.85 MHz as shown. The signal of FIG. 2 is generated in accordance with U.S.A. field and line standards of 60 fields per second and 525 lines per picture each picture scan consisting of a field scan and its interlacing field scan.

Referring again to FIG. 1 the signal of FIG. 3 is reproduced from the record by the reproducing apparatus 10 and appears on its output lead 15 connected to two filters 16 and 17. The filter 16 is designed to pass the signal 14 of FIG. 3 and to reject the sound signal whereas the filter 17 is designed to pass the sound signal and reject the signal 14.

The signal 14 passed by the filter 16 is demodulated by a demodulator 18 and fed to two comb filters 19 and 20. The filter 19 acts to pass the luminance signal $E_Y'$ and to reject the chroma signal. The filter 20 acts to pass the chroma signal and reject the luminance signal $E_Y'$. A demodulator 21 fed from the filter 20 recovers the signals ($E_R$-$E_Y'$) and ($E_B$-$E_Y'$) from the sub-carrier and all three signals—$E_Y'$, ($E_R$-$E_Y'$) and ($E_B$-$E_Y'$)—are fed to an encoder 22.

The encoder 22 is a PAL encoder in which the PAL colour-difference signals $E_U$ and $E_V$ are derived and applied to modulate standard PAL sub-carriers in phase-quadrature with phase-inversion of the $E_V$ sub-carrier at half-line frequency. The sub-carrier frequency is of the standard 4.43361875 $MH_z$ used in the U.K. The chroma signal thus produced is added to the luminance signal $E_Y'$ to provide a hybrid signal on its output lead of the form shown in FIG. 4. In this signal the luminance component in accordance with U.S.A. frame and line scanning standards (to the degree of accuracy permitted by the mechanism of the reproducer 10) occupies a band of 0-3 MHz as shown by the curve 23. The chroma signal in accordance with U.K. PAL standards occupies a band of about 1 MHz centred on the sub-carrier frequency of 4.43361875 MHz as shown by the curve 24.

Referring back to FIG. 1 the sound signal on its subcarrier is fed from the filter 17 to a demodulator 25 and the demodulated sound signal is applied to a modulator 26 where it is applied to modulate a 6 MHz sub-carrier this being the sub-carrier frequency used in U.K. PAL receivers.

The outputs of the encoder 22 and modulator 26 are then combined and fed to a further modulator 27 where they are applied to modulate a UHF carrier of a frequency which puts the signal into a selected one of the current television channels used by the B.B.C. and the I.B.A. for domestic broadcasts.

The output of the modulator 27 is applied through a coaxial cable 28 to the aerial socket 29 of a domestic U.K. PAL colour television receiver 30.

It will be appreciated that the frame and line synchronising pulses of the U.S. standard accompany the luminance signal and that the PAL encoder 22 also provides the standard PAL alternating colour-burst signals.

Thus the receiver 30 is driven by the frame and line synchronising pulses to operate in accordance with U.S.A. frame and line standards and that the chroma, separator demodulator and matrix circuits of the PAL receiver provide the $E_R'$, $E_B'$ and $E_G'$ signals for reproducing the images.

It is usual in domestic receivers to include in the Y-channel a notch filter which severely attenuates the chroma signal and hence dot-patterning is no different from that currently experienced. Each picture is built up of 525 lines instead of 625 but this lowering of vertical resolution is only to the U.S. standard which is acceptable in the U.S.A. and hence is similarly acceptable in Europe.

Although an embodiment has been described for use with a PAL receiver it will be apparent to those skilled in the art that the encoder 22 can alternatively be designed to encode in accordance with SECAM standards. It will also be appreciated that, if desired the composite signal formed by adding the outputs of the encoder 22 and modulator 26 can be fed direct to the video circuit of the receiver whereby the need for the modulator 27 can be avoided.

In providing the mechanism in the record reproducer 10 to rotate the record past the pick-up device it is necessary to produce a rotational speed such that the recorded signals are reproduced in accordance with the U.S. standard of 60 fields per second. In order to enable reproduction to be effected from recordings made in accordance with the European standard of 50 fields per second and 625 lines per picture it is necessary to include a gear-changing mechanism to change the speed of rotation accordingly.

However, it will be appreciated that the invention facilitates the formulation of an international standard based upon the U.S. field frequency of 60 fields per second and 525 lines per picture whereby the need for such gear-changing mechanism could be avoided.

In the arrangements currently proposed by the Philips Company the bandwidth of the luminance signal is also restricted to 3 MHz but the chroma signal is located outside the band of the luminance signal and hence the filters 19 and 20 would need to be engineered accordingly.

Again, however, if by means of the present invention an international standard is reached simplification and uniformity of apparatus will be facilitated.

Where the domestic receiver embodies a frame timebase circuit with feedback such that the frame amplitude is the same irrespective of whether the applied signals are according to U.S. or European standards no modification to the receiver is necessary to maintain the picture geometry constant. Where this is not the case provision is necessary in the receiver for so switching the frame timebase circuit as to maintain correct geometry when using signals according to U.S. standards.

It will be appreciated that instead of using a mechanical arrangement to change the speed of rotation of the record to suit the U.K. and U.S. standards as appropriate, speed-changing can be effected electrically. For example 50 Hz and 60 Hz supplies can be produced for the synchronous motor by the employment of a high-frequency oscillator in conjunction with a counter acting as a frequency-divider. The counter can be switched to provide a 50 Hz or 60 Hz output as required and a power amplifier operated from the counter can be used to drive the motor.

It will also be appreciated that although embodiments have been described with reference to disc records the invention is equally applicable to linear records such as magnetic tapes.

We claim:
1. Color television conversion apparatus comprising,
   (a) mechanism for moving a color television record past a pick-up device at a speed to reproduce color television signals recorded on the record in accordance with the field and line standards in the United States of America of 60 field scans and 525 line scans per picture,
   (b) decoding apparatus,
   (c) means to apply the said reproduced signals to the said decoding apparatus to recover the luminance and demodulated color-difference signals therefrom,
   (d) encoding apparatus, and
   (e) means to apply said recovered luminance and demodulatd color-difference signals to said encoding apparatus to produce therefrom a hybrid signal in which the field and line scanning frequencies are in accordance with the standards of the United States of America and the color-difference signals are encoded therewith in accordance with the European PAL or SECAM standards.

2. Apparatus according to claim 1, and including means for recovering sound signals from the said reproduced color television signals and means to modulate the sound signals upon a sub-carrier in accordance with European PAL or SECAM standards.

* * * * *